United States Patent [19]
Kino et al.

[11] Patent Number: 4,525,774
[45] Date of Patent: Jun. 25, 1985

[54] REGULATED AC-DC CONVERTER HAVING SATURATION INDUCTANCE IN RESONANT CIRCUIT

[75] Inventors: Jirou Kino, Seto; Toshirou Uemura, Nagoya, both of Japan

[73] Assignee: Hitachi, Ltd., Tokyo, Japan

[21] Appl. No.: 438,948

[22] Filed: Nov. 3, 1982

[30] Foreign Application Priority Data

Nov. 24, 1981 [JP] Japan .................................. 56-188132

[51] Int. Cl.³ ............................................ H02P 13/22
[52] U.S. Cl. ....................................... 363/17; 363/37; 363/98
[58] Field of Search ......................... 363/16, 17, 25, 37, 363/98; 333/177

[56] References Cited

U.S. PATENT DOCUMENTS 3,596,165  7/1971  Andrews ................................ 363/16

FOREIGN PATENT DOCUMENTS 35679    4/1981  Japan ..................................... 363/16
1391902  4/1975  United Kingdom .................... 363/17

OTHER PUBLICATIONS

"Frequency-Controlled Voltage Regulator", NASA Tech. Briefs, vol. 5, No. 2, p. 156, (Summer 1980).
"The Supply Specifier Has a Basic Choice", Electronics, pp. 108-114, Jun. 16, 1981.

Primary Examiner—William H. Beha, Jr.
Attorney, Agent, or Firm—Antonelli, Terry & Wands

[57] ABSTRACT

A switching power source device, in which a DC voltage obtained by rectifying an AC voltage is converted by switching elements into an AC voltage, which is subjected to voltage conversion by a transformer and rectified by a rectifier circuit to output a DC voltage therefrom. In one embodiment, a resonance capacitor and a saturable transformer form a series resonant circuit, and switching elements are subjected to frequency modulation control. In another embodiment, an inductor connected in parallel with a non-saturable transformer, and a capacitor connected in series to the same transformer, form a series resonant circuit, and the switching elements are subjected to frequency modulation control. In each embodiment, the series resonant circuit is subjected to frequency modulation control, and the electric currents from the switching elements do not rise and fall suddenly. Accordingly, switching losses and noise can be minimized, and the output voltages can be controlled easily.

5 Claims, 6 Drawing Figures

REGULATED AC-DC CONVERTER HAVING SATURATION INDUCTANCE IN RESONANT CIRCUIT

BACKGROUND OF THE INVENTION

This invention relates to a switching power source device, and more particularly to a switching power source device in which a DC voltage obtained by rectifying a voltage from an AC power source is subjected to high-frequency conversion by switching elements consisting of transistors, the resulting voltage being amplified or attenuated to the required level by a transformer to obtain an AC output, which is further rectified and smoothed as necessary to obtain DC outputs.

There are various systems of switching power source devices adapted to switch a DC voltage obtained by rectifying a voltage from an AC power source by using switching elements. FIG. 1 shows an example of a half-bridge type of switching power source device using power MOSFETs (metal-oxide-semiconductor field effect transistors) as switching elements, and FIG. 2 shows the operating waveforms of parts of the device shown in FIG. 1. The switching power source device shown in FIG. 1 consists of a rectifier circuit 13 which changes an AC voltage supplied from an AC power source 12 into a DC voltage; a smoothing capacitor 1 which smooths the DC voltage output from the rectifier circuit 13; FETs 2, 3 which alternately switch the smoothed DC voltage at high speed; capacitors 4, to which the electric currents switched by the FETs are applied; a transformer 5, to which an electric current Iin flowing through the capacitors 4 is applied, the transformer 5 having a primary coil 5a, secondary coils 5c, 5d, and a core 5b magnetically connecting these coils; a plurality of diodes 8 rectifying the AC voltages output from the secondary coils 5c and 5d of the transformer 5; two output filter circuits to smooth the DC voltages output from the diodes 8 and output them as DC voltages Vout 1, Vout 2, each of the output filter circuits being composed of an inductor 9 and a capacitor 10; and a pulse width modulator circuit 11 which receives the DC voltage Vout 1 as an input thereinto to carry out the switching operations of the FETs 2, 3.

The switching power source device having the above construction operates as follows.

The AC voltage output from the AC power source 12 is converted into a smoothed DC voltage by the rectifier circuit 13 and smoothing capacitor 1. This DC voltage is converted into an alternating current Iin through the capacitors 4 by the FETs 2, 3, which are turned on and off alternately, as shown in FIG. 2, by the pulse width modulator control circuit 11. The AC current Iin is applied as an AC voltage Vin across the primary coil 5a of the transformer 5. The voltage Vin applied across the primary coil 5a is transformed by the core 5b of the transformer 5 and output to the secondary coils 5c, 5d. The AC voltages output from the secondary coils 5c, 5d are smoothed by the diodes 8 and output filter circuits and are output as DC voltages Vout 1, Vout 2, respectively. The pulse width modulator control circuit 11 receives the DC voltage Vout 1 as an input to control the width of the pulses switching on and off the FETs 2, 3 in such manner that the DC voltage Vout 1 attains a predetermined level. A switching power source device similar to the above device is disclosed in U.S. Pat. No. 3,916,286.

In order to reduce the switching losses of the FETs 2, 3 due to the modulation of the pulse width, it is necessary in the above switching power source device that each voltage and current rises or falls suddenly. However, when a voltage or current suddenly rises or falls in this device, noise occurs during the switching of the FETs 2, 3. When a voltage suddenly rises or falls in this device, losses due to the inverse recovery characteristics and noise occurs in the diodes 8 on the secondary side of the transformer 5. Furthermore, this device employs a miniaturized transformer to increase the frequency of the output therefrom, and a plurality of outputs are obtained from this transformer. Accordingly, it is difficult to connect the primary and secondary coils magnetically in a satisfactory manner.

SUMMARY OF THE INVENTION

An object of the present invention is to provide a switching power source device, which minimizes losses in the switching elements and diodes as well as the occurrence of noise. In order to achieve this object, the switching power source device according to the present invention is provided with a saturable transformer which converts the voltage of a high-frequency AC current obtained by switching a DC voltage by switching elements and outputs a plurality of AC voltages; a resonance capacitor, which is connected in series with a circuit wherein the high-frequency alternating current is applied from the switching elements to the saturable transformer, and which forms a series resonance circuit with the saturable transformer; and a circuit for subjecting the switching elements to frequency modulation control. In the switching power source device according to the present invention, a saturation inductor connected in parallel with a non-saturable transformer, and the resonance capacitor connected in series thereto, form a series resonance circuit which subjects the switching elements to frequency modulation control. In the power source device according to the present invention, a plurality of non-saturable transformers may be substituted for the above transformer, and a plurality of output circuits consisting of rectifier circuits may be provided. When the series resonance circuit provided in the above manner is subjected to frequency control through the switching elements, switching losses, diode losses and noise can be minimized.

DETAILED DESCRIPTION OF THE PREFERRED EMBODIMENTS

Figure 3:
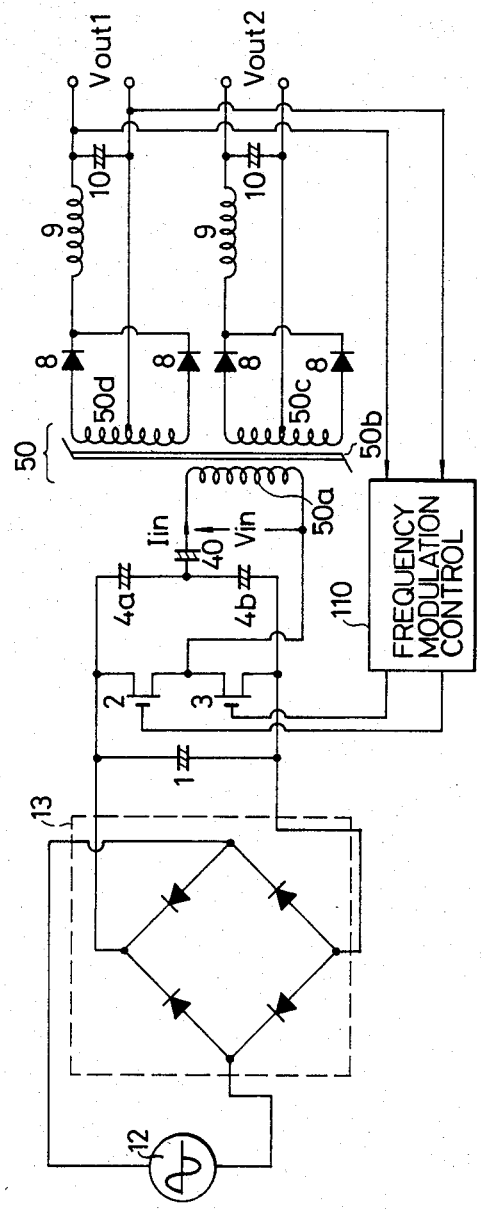
FIG. 3 shows the circuit of one embodiment of a switching power source device according to the present invention.

Embodiments of the switching power source device according to the present invention will now be described with reference to the drawings. FIG. 3 shows the circuit of an embodiment of a switching power source device according to the present invention, and FIG. 4 the switching operations of, and the electric current and voltage generated by the FETs making up the switching elements in the device shown in FIG. 3.

This embodiment of the power source device according to the present invention consists of a rectifier circuit 13 and a smoothing capacitor 1, which rectify and smooth an AC voltage supplied from an AC power source 12; FETs 2, 3 that alternately and rapidly switch the DC voltage smoothed by the smoothing capacitor 1 and output the resulting voltages; capacitors 4a, 4b, to which the electric currents switched by the FETs 2, 3 are applied, respectively; a saturable transformer 50, to which the electric current Iin flowing through the capacitor 4a or 4b is applied, the saturable transformer 50 being composed of a primary coil 50a, secondary coils 50c, 50d, and a core 50b magnetically connecting the primary and secondary coils 50a, 50c, 50d together; rectifier circuits and smoothing circuits which rectify and smooth the AC voltages output by the secondary coils 50c and 50d of the saturable transformer 50, the rectifier circuits each being composed of a plurality of diodes 8, the smoothing circuits each being composed of an inductor 9 and a capacitor 10; and a frequency modulation control circuit 110 which inputs a DC voltage Vout 1, which is output from one of the smoothing circuits, and thereby subject the FETs 2, 3, the switching elements, to frequency modulation control.

If the current output from the switching power source device is zero, i.e. if the power source device has no load, the series resonant frequency $f_0$ of the saturable transformer 50 can be expressed by the following equation, in which L is the input inductance of the saturable transformer 50, and C is the electrostatic capacity (farad):

$$f_0 = \tfrac{1}{2}\pi \sqrt{L \cdot C} \qquad (1)$$

When the on-off frequencies of the FETs 2, 3 are made close to the above resonant frequency $f_0$, the voltage applied across the resonance capacitor 40 and transformer 50 attains a level (proportional to Q (the quality factor) of the resonant circuit) higher than that of the power source voltage and high enough to compensate for losses in the circuit. However, since the transformer 50 consists of a saturable transformer, the voltage applied to the capacitor 40 and transformer 50 does not increase Q times, it is limited to a level defined by the following equation (2):

$$e_{av} = 4B_s A N f \times 10^{-8} (V) \ldots \qquad (2)$$

wherein $e_{av}$ is the average value (V) of the voltage applied; $B_s$ is the saturation magnetic flux density (gauss) of the core; A is the effective cross-sectional area (cm²) of the core; N is the number (T) of windings of the primary coil; and f is the frequency (Hz).

Namely, when the result obtained by multiplying the voltage applied by the time reaches a predetermined value, the inductance of the transformer 50 suddenly decreases, and a resonating current flows through the resonance capacitor 40 at a frequency higher than $f_0$ of equation (1) above, which is determined by the saturation inductance and the capacity of the resonance capacitor. Consequently, the polarity of the voltage applied to the transformer 50 is reversed.

Figure 1:
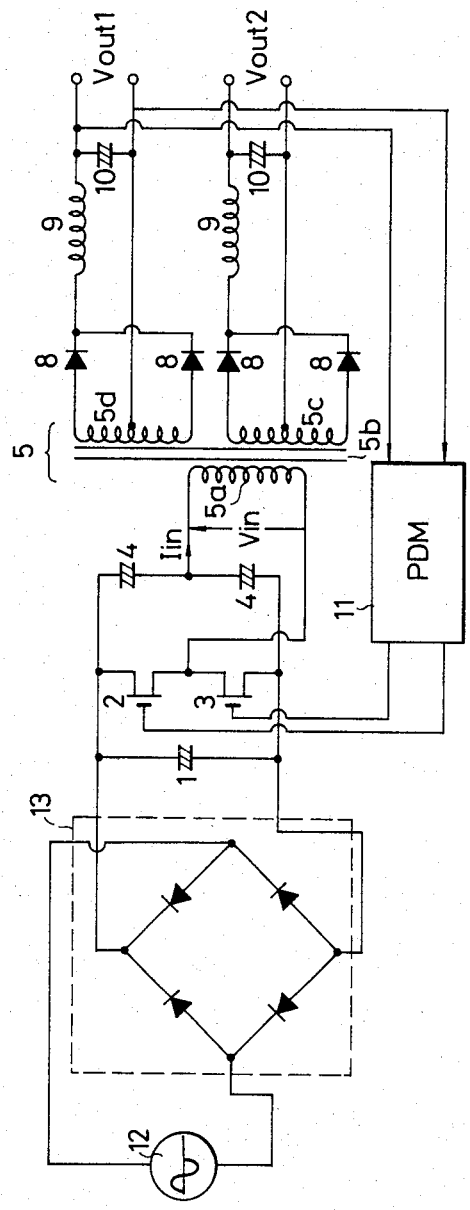
FIG. 1 shows the circuit of a conventional switching power source device.
Figure 2:
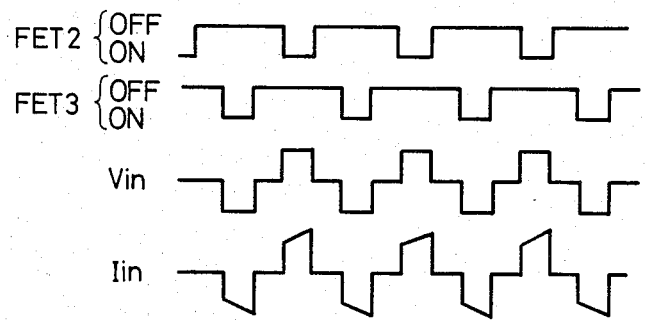
FIG. 2 shows the switching operations of, and the electric current and voltage in, the switching power source device of FIG. 1.

The main differences between this embodiment of the present invention and the prior art power source device shown in FIG. 1 are the following:

(1) The transformer 5 in the conventional power source device is replaced by the saturable transformer 50.

(2) The resonance capacitor 40 is inserted between the junction between the capacitors 4a, 4b and the transformer 50 in the present invention.

(3) The pulse width modulation control circuit 11 controlling the switching elements, which consist of FETs 2, 3, is replaced by the frequency modulation control circuit 110.

Figure 4:
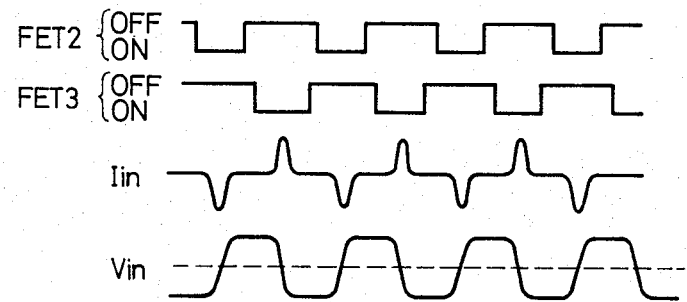
FIG. 4 shows the switching operations of, and the electric current and voltage in, the switching power source device of FIG. 3.

FIG. 4 shows in a simplified manner the waveforms of the operations of the circuit of the device shown in FIG. 3. The operations of the circuit of this embodiment of the present invention will be described with reference to FIGS. 3 and 4.

The AC voltage output from the AC power source 12 in the switching power source device shown in FIG. 3 is converted into a smoothed DC voltage by the rectifier circuit 13 and smoothing capacitor 1. This smoothed and rectified DC voltage is input to the primary coil 50a of the saturable transformer 50 while the direction in which it flows is alternated by the FETs 2, 3 which are being turned on and off alternately. The voltage Vin across the capacitor 40 and the current Iin at this time become, as shown in FIG. 4, an AC voltage which reverses every predetermined period of time, and an alternating current which peaks alternately when the AC voltage reverses. The reasons why the above phenomena occur are as follows. When the result referred to previously obtained by multiplying the voltage applied to the transformer 50 by time exceeds a predetermined value, the inductance of the transformer 50 suddenly decreases, and a resonant current flows, the frequency of which is higher than the frequency $f_0$ of equation (1), so that the polarity of the voltage applied to the transformer 50 is reversed. This can be easily understood when the operational characteristics of the transformer 50 are compared with those of a ferroresonance constant voltage transformer. FIG. 4 illustrates the characteristics of this embodiment when unloaded, as mentioned previously, in order that the operation of the embodiment can be easily understood. This will naturally lead those skilled in the art to the thought that, when a load is connected to the output, the Q of the resonance circuit, mentioned in the previous paragraph, will decrease.

The transformer 50 transforms the voltage Vin applied to the primary coil 50a via the core 50b, and outputs AC voltages from the secondary coils 50c, 50d. The AC voltages output by the secondary coils 50c, 50d are converted into DC voltages by the rectifier circuits each consisting of a plurality of diodes 8, and the DC voltages are then smoothed by the smoothing circuits each consisting of an inductance 9 and capacitor 10. The smoothed DC voltages are output as output voltages Vout 1, Vout 2, respectively.

The frequency modulation control circuit 110 inputs the output voltage Vout 1 and compares it with a reference voltage to control the switching operations of the FETs 2, 3 in such a manner that the output voltage Vout 1 attains a predetermined level. Because of the control operations of the frequency modulation control circuit 110, the voltages Vout 1, Vout 2 output from this switching power source device can be maintained at predetermined levels.

As described above, when the saturable transformer 50 and resonance capacitor 40 are used to form a series resonant circuit as in the above embodiment, with the switching elements FETs subjected to frequency control, a switching power source device, which minimizes switching losses and noise and easily controls the output voltages, even if the electric current does not rise and fall suddenly, can be obtained.

A second embodiment of the switching power source device according to the present invention will now be described with reference to FIG. 5.

The switching power source device of this embodiment consists of a rectifier circuit 13 and smoothing capacitors 560, which rectify and smooth the AC voltage supplied from an AC power source 12; transistors 540, 550 which alternately and rapidly switch over and output the DC voltage smoothed by the smoothing capacitors 560; a resonance capacitor 520, through which the electric current switched by the transistor 540 or 550 passes; a first output circuit, which includes a non-saturable transformer 500 which receives the electric current passing through the capacitor 520, and outputs a first output voltage Vout 1; a second output circuit connected in parallel with the non-saturable transformer 500 which outputs a second output voltage Vout 2; and a frequency modulation control circuit 110 which inputs the voltage Vout 1 output from the first output circuit and controls the switching operations of the transistors 540, 550 in such a manner that the output voltage Vout 1 attains a predetermined level. The first output circuit is provided with a rectifier circuit, which rectifies the AC voltage output from the secondary coil of the non-saturable transformer 500, and which consists of a plurality of diodes 8; and a smoothing circuit, which outputs the DC voltage obtained by the rectifying operation of the rectifier circuit, and which consists of an inductance 9 and a capacitor 10. The second output circuit is provided with a non-saturable transformer 600, and a rectifier circuit and a smoothing circuit which rectify and smooth the AC voltage output from the secondary coil of the non-saturable transformer 600, the second output circuit outputting the DC voltage Vout 2. The number of the above output circuits may be increased.

The constructional differences between this embodiment and the embodiment shown in FIG. 3 are as follows. The saturable transformer shown in FIG. 3 is replaced by a saturation inductance and non-saturable transformer. The transformer is divided into two parts according to output voltages. The FETs are replaced by the transistors. Because of the above construction, the saturation voltage and the reactive current can be determined by the saturation inductance, which is separate from the transformer. This means that the circuit constant can be determined easily, and also the conversion transformer can be designed easily. Such an arrangement also makes it possible to design a power source device of this kind advantageously with respect to core losses, which would otherwise pose problems during high-frequency operation.

In the switching power source device as described above, the DC voltage which is obtained by the rectifying operation of the rectifier circuit 13, and which is then smoothed by the smoothing capacitors 560, in the same manner as in the embodiment shown in FIG. 3, is converted into an AC voltage by the switching operations of the transistors 540, 550, and AC voltages are supplied to the output circuits. When the result obtained by multiplying the voltage applied to the saturation inductance 510 by time exceeds a predetermined value, the inductance of the inductance 510 suddenly decreases, so that a resonant current flows, the frequency of which is higher than the frequency $f_0$ of equation (1) above. Consequently, the polarity of the AC voltages supplied to the output circuits is reversed. The AC voltages applied to the non-saturable transformers 500, 600 in the output circuits are transformed thereby, and then rectified by the rectifier circuits and smoothed by the smoothing circuits to be output as voltages Vout 1, Vout 2. These output voltages are controlled at predetermined levels by the operation of the frequency modulation control circuit 110 which controls the switching operations of the transistors 540, 550.

In this embodiment, the saturation inductance and the plurality of non-saturable transformers are used, and the saturation voltage and reactive current are determined by the saturation inductance, which is separate from the transformers. This means that the circuit constant can be determined easily, the transformers can be designed easily, and core losses in the transformers during high-frequency operation are minimized.

Figure 5:
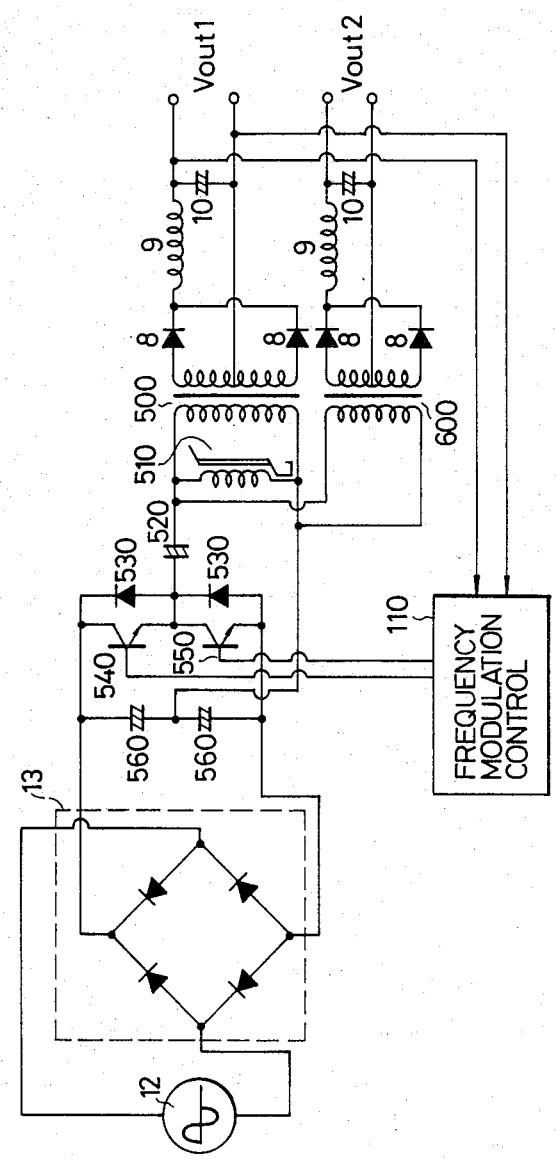
FIG. 5 shows the circuit of a second embodiment of a switching power source device.
Figure 6:
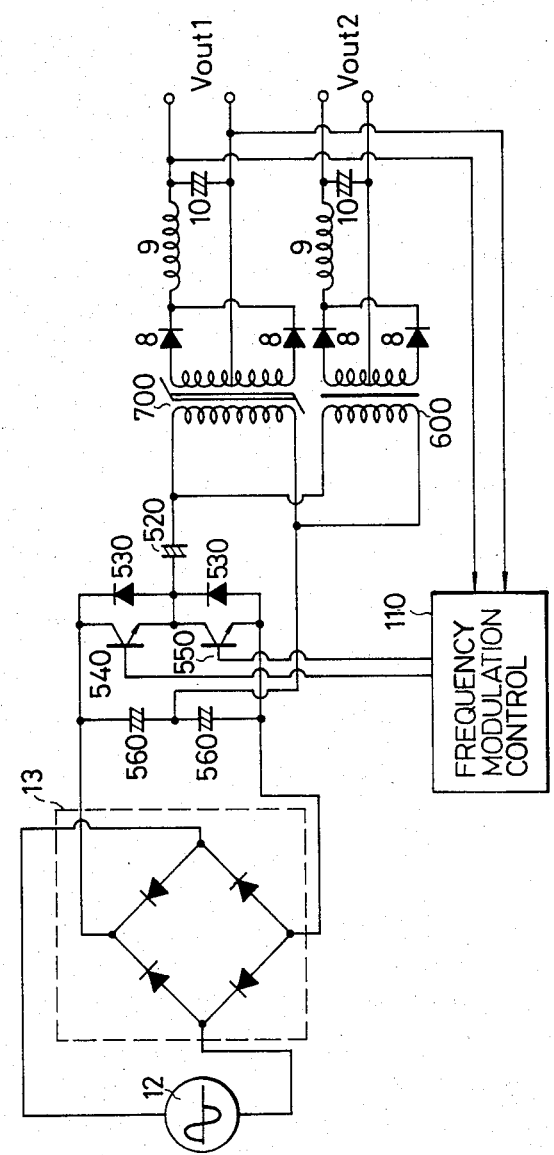
FIG. 6 shows the circuit of a third embodiment of a switching power source device according to the present invention.

FIG. 6 shows a third embodiment of the present invention, which differs from the embodiment shown in FIG. 5, with respect to the saturation inductance and transformer used in the latter.

The saturation inductance 510 employed in the device shown in FIG. 5 is not provided in the switching power source device in the embodiment shown in FIG. 6, and a saturable transformer 700 is used instead of the non-saturable transformer 500 provided in the device shown in FIG. 5. Since the transformer in one output circuit consists of a saturable transformer, the construction of the circuit of this device can be simplified. The same reference numerals used in FIGS. 6 and 5 designate the same parts.

As described above, the present invention provides a switching power source device which combines the saturation characteristics of the core of a transformer and the series resonance characteristics of an inductance and a capacitor, and which is capable of minimizing switching losses in the switching elements and controlling the output voltages easily.

What is claimed is:

1. A switching power source device in which a DC voltage obtained by rectifying an AC voltage is converted into a high-frequency AC voltage which is subjected to voltage conversion to output at least one AC voltage which is then rectified, comprising:
    first rectifying circuit means for rectifying an AC voltage into a DC voltage;
    switching means for converting the DC voltage obtained by rectifying the AC voltage in said first rectifying circuit means into a high-frequency AC voltage;
    transformer means for subjecting the high-frequency AC voltage obtained by a conversion operation of said switching means to voltage conversion to output at least one AC voltage;
    first circuit means for applying the high-frequency AC voltage obtained by the conversion operation of said switching means to said transformer means, said first circuit means including a capacitor connected in series between said transformer means and said switching means;

second rectifying circuit means for rectifying the at least one AC voltage obtained by the voltage conversion operation of said transformer means to output at least one DC voltage; and frequency modulation control circuit means for subjecting said switching means to frequency modulation control so that at least one DC voltage output from said second rectifying circuit means attains a predetermined level;

wherein said transformer means includes a first non-saturable transformer for receiving the high-frequency AC voltage obtained by the conversion operation of said switching means, said capacitor being connected in series between said first non-saturable transformer and said switching means, said first circuit means including a saturation inductance connected in parallel with said first non-saturable transformer and said switching means and forming a resonant circuit with said capacitor, said second rectifying means rectifying the AC voltage output from said first non-saturable transformer.

2. A switching power source device according to claim 1, wherein said frequency modulation control circuit means is responsive to one DC voltage output for subjecting said switching means to frequency modulation control in accordance therewith so as to attain a predetermined level for the one DC voltage output.

3. A switching power source device in which a DC voltage obtained by rectifying an AC voltage is converted by switching elements into a high-frequency AC voltage, which is subjected to voltage conversion by a transformer and then rectified to output voltages, comprising: a first rectifier circuit which rectifies an AC voltage into a DC voltage; switching means for converting the DC voltage obtained by rectifying the AC voltage in said first rectifier circuit into a high-frequency AC voltage; transformer means including a first non-saturable transformer which receives the high-frequency AC voltage obtained by the conversion operation of said switching means, and subjects the high-frequency AC voltage to voltage conversion; a first circuit means for applying the high-frequency AC voltage obtained by the conversion operation of said switching means to said first non-saturable transformer, said first circuit means including a capacitor connected in series between said first non-saturable transformer and said switching means and a saturation inductance connected in parallel between said first non-saturable transformer and said switching means and forming a resonant circuit with said capacitor; a second rectifier circuit which rectifies the AC voltage output from said first non-saturable transformer to output a DC voltage; and a frequency modulation control circuit which subjects said switching means to frequency modulation control in such a manner that the DC voltage output from said second rectifier circuit attains a predetermined level.

4. A switching power source device according to claim 3, wherein said first non-saturable transformer is connected in parallel with at least one second non-saturable transformer, said second rectifier circuit including means connected to said second non-saturable transformer for rectifying the AC voltage output from said second non-saturable transformer to output a DC voltage.

5. A switching power source device in which a DC voltage obtained by rectifying an AC voltage is converted into a high-frequency AC voltage which is subjected to voltage conversion to output at least one AC voltage which is then rectified, comprising:

first rectifying circuit means for rectifying an AC voltage into a DC voltage;

switching means for converting the DC voltage obtained by rectifying the AC voltage in said first rectifying circuit means into a high-frequency AC voltage;

transformer means for subjecting the high-frequency AC voltage obtained by a conversion operation of said switching means to voltage conversion to output at least one AC voltage;

first circuit means for applying the high-frequency AC voltage obtained by the conversion operation of said switching means to said transformer means, said first circuit means including a capacitor connected in series between said transformer means and said switching means;

second rectifying circuit means for rectifying the at least one AC voltage obtained by the voltage conversion operation of said transformer means to output at least one DC voltage; and frequency modulation control circuit means for subjecting said switching means to frequency modulation control so that at least one DC voltage output from said second rectifying circuit means attains a predetermined level;

wherein said transformer means includes a first non-saturable transformer for receiving the high-frequency AC voltage obtained by the conversion operation of said switching means and at least one second non-saturable transformer, said at least one second non-saturable transformer being connected in parallel with said first non-saturable transformer and providing an AC voltage output, said capacitor being connected in series between said first non-saturable transformer and said switching means, said first circuit means including a saturation inductance connected in parallel with said first non-saturable transformer and said switching means and forming a resonant circuit with said capacitor, said second rectifying means rectifying the AC voltage output from said first non-saturable transformer and including means for rectifying the AC voltage output from said second non-saturable transformer to output a DC voltage.

* * * * *